(12) United States Patent
Thoria et al.

(10) Patent No.: US 11,916,786 B2
(45) Date of Patent: Feb. 27, 2024

(54) DISTRIBUTED ROUTING CONTROLLERS FOR MULTI-REGION SDWAN

(71) Applicant: Cisco Technology, Inc., San Jose, CA (US)

(72) Inventors: Samir Thoria, Saratoga, CA (US); Vivek Agarwal, Campbell, CA (US); Satish Kumar Mahadevan, San Ramon, CA (US); Laxmikantha Reddy Ponnuru, San Ramon, CA (US); Jean-Marc Barozet, Le Perreux sur Marne (FR); Hamzah Kardame, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

(21) Appl. No.: 17/586,204

(22) Filed: Jan. 27, 2022

(65) Prior Publication Data

US 2023/0052974 A1 Feb. 16, 2023

Related U.S. Application Data

(60) Provisional application No. 63/232,946, filed on Aug. 13, 2021.

(51) Int. Cl.
*H04L 45/64* (2022.01)
*H04L 9/40* (2022.01)
(Continued)

(52) U.S. Cl.
CPC .......... *H04L 45/64* (2013.01); *H04L 41/0894* (2022.05); *H04L 45/02* (2013.01); *H04L 63/029* (2013.01)

(58) Field of Classification Search
None
See application file for complete search history.

(56) References Cited

U.S. PATENT DOCUMENTS

| 2019/0007836 A1* | 1/2019 | Ocak ..................... H04W 12/55 |
| 2019/0268237 A1 | 8/2019 | Kulkarni et al. |

(Continued)

FOREIGN PATENT DOCUMENTS

| EP | 2 421 206 A1 | 2/2012 |
| WO | 2013/120512 A1 | 8/2013 |
| WO | 2016/074522 A1 | 5/2016 |

OTHER PUBLICATIONS (Author Unknown, Linear Search Explained, retrieved from the internet archive, www.archive.org, pp. 1-12, as stored on Oct. 23 (Year: 2020).*

(Continued)

*Primary Examiner* — Christopher M Crutchfield
(74) *Attorney, Agent, or Firm* — Baker Botts L.L.P.

(57) ABSTRACT

According to some embodiments, a software defined wide area network (SD-WAN) includes a first region and a second region. The first region includes multiple first routing controllers and multiple first SD-WAN edge routers. The second region includes multiple second routing controllers and multiple second SD-WAN edge routers. Each first SD-WAN edge router of the first region is configured to establish Overlay Management Protocol (OMP) peering connections with the plurality of first routing controllers of the first region but to avoid establishing OMP peering connections with the plurality of second routing controllers of the second region. Each second SD-WAN edge router of the second region is configured to establish OMP peering connections with the plurality of second routing controllers of the second region but to avoid establishing OMP peering connections with the plurality of first routing controllers of the first region.

9 Claims, 3 Drawing Sheets

(51) Int. Cl.
*H04L 45/02* (2022.01)
*H04L 41/0894* (2022.01)

(56) References Cited

U.S. PATENT DOCUMENTS

| | | | |
|---|---|---|---|
| 2020/0177606 A1* | 6/2020 | Valluri | H04L 63/20 |
| 2020/0336336 A1* | 10/2020 | Sethi | H04L 45/38 |
| 2021/0112034 A1 | 4/2021 | Sundarajan et al. | |
| 2021/0160179 A1 | 5/2021 | Sundararajan et al. | |
| 2021/0243053 A1* | 8/2021 | Dunbar | H04L 45/033 |
| 2021/0288881 A1 | 9/2021 | Zhang | |
| 2021/0352001 A1* | 11/2021 | Tourrilhes | H04L 43/0876 |
| 2022/0103471 A1* | 3/2022 | Kulkarni | H04L 41/122 |
| 2023/0079689 A1* | 3/2023 | Dunbar | H04L 63/164 |

OTHER PUBLICATIONS

Patent Cooperation Treaty, PCT Written Opinion of the International Searching Authority (PCT Rule 43bis.1), Intl. Application PCT/US2022/074737, dated Nov. 7, 2022.
Cisco Live !: "Cisco SDWAN Design & Deployment" (84 pages).
Vivekananthan Devaraj; Citrix Product Documentation—Reference Architecture: SD-WAN Multi-Region, May 4, 2021.

\* cited by examiner

DISTRIBUTED ROUTING CONTROLLERS FOR MULTI-REGION SDWAN

RELATED APPLICATIONS

This application claims priority to U.S. Provisional Application Ser. No. 63/232,946 entitled "Distributed Routing Controllers for Multi-Region SDWAN," filed Aug. 13, 2021, the entire content of which is incorporated herein by reference.

TECHNICAL FIELD

This disclosure generally relates to software defined networking in a wide area network (SD-WAN), and more specifically to distributed routing controllers for multi-region SD-WAN.

BACKGROUND

Traditional wide area network (WAN) architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures may be limited in available bandwidth, security, and complexity management, which may hinder a business's productivity.

Software defined networking in a WAN (SD-WAN) simplifies the management and operation of a WAN by decoupling the networking hardware from its control mechanism. Advantages include reducing costs with transport independence across multiple technologies, improving business application performance and increasing agility, optimizing the user experience and efficiency for SaaS and public cloud applications, and simplifying operations with automation and cloud-based management. Existing SD-WANS, however, may be difficult to scale due to limitations of routing controllers.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
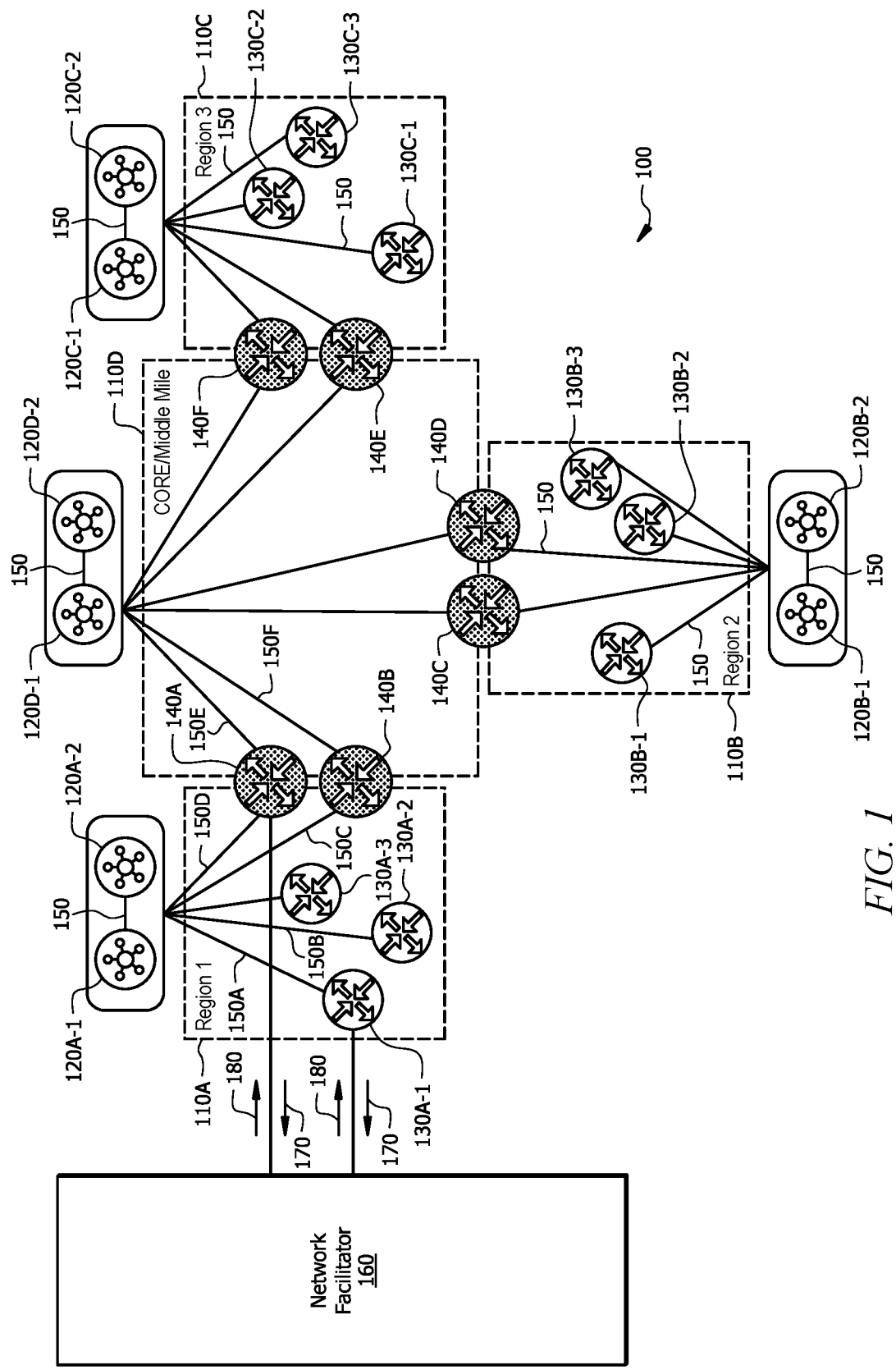
FIG. 1 is network diagram illustrating a multi-region SD-WAN with distributed routing controllers, according to some embodiments.

According to some embodiments, a software defined wide area network (SD-WAN) includes a first region and a second region. The first region includes multiple first routing controllers and multiple first SD-WAN edge routers. The second region includes multiple second routing controllers and multiple second SD-WAN edge routers. Each first SD-WAN edge router of the first region is configured to establish Overlay Management Protocol (OMP) peering connections with the plurality of first routing controllers of the first region but to avoid establishing OMP peering connections with the plurality of second routing controllers of the second region. Each second SD-WAN edge router of the second region is configured to establish OMP peering connections with the plurality of second routing controllers of the second region but to avoid establishing OMP peering connections with the plurality of first routing controllers of the first region.

According to another embodiment, a method performed by a SD-WAN edge router in a SD-WAN includes sending a register request to a network facilitator of the SD-WAN. The register request includes a particular region identifier of the SD-WAN edge router. The method further includes receiving a list of routing controllers from the network facilitator of the SD-WAN. The list of routing controllers identifies a plurality of routing controllers of the SD-WAN. Each routing controller in the list of routing controllers received from the network facilitator has a region identifier that matches the particular region identifier of the SD-WAN edge router. The method further includes establishing OMP peering connections with the plurality of routing controllers in the list of routing controllers from the network facilitator. The method further includes avoiding establishing OMP peering connections with any other routing controller that has a different region identifier from the particular region identifier of the SD-WAN edge router.

According to yet another embodiment, a method performed by a SD-WAN facilitator in a SD-WAN includes receiving a first region identifier from a plurality of first routing controllers of a first region. The method further includes receiving a second region identifier from a plurality of second routing controllers of a second region. The method further includes receiving a register request from a SD-WAN edge router. The register request includes a particular region identifier of the SD-WAN edge router. The method further includes determining that the particular region identifier of the SD-WAN edge router matches the first region identifier of the plurality of first routing controllers of the first region. The method further includes sending a list of routing controllers the SD-WAN edge router. The list of routing controllers includes the plurality of first routing controllers and excludes the plurality of second routing controllers.

Technical advantages of certain embodiments of this disclosure may include one or more of the following. Certain systems and methods described herein prevent a full mesh of peering/control connections between all routing controllers of a SD-WAN. Unlike existing SD-WANs where a centralized pool of routing controllers (e.g., vSmart controllers) store route information for all regions of the SD-WAN, embodiment of this disclosure provide distributed, per-region routing controllers that only store route information for the region to which they are assigned. Furthermore, each edge router in a particular region only peers with the routing controllers of that particular region. By offering a SD-WAN with distributed, per-region routing controllers, SD-WANs may be able to scale horizontally to a greater degree than existing SD-WANs. Furthermore, by reducing the number of routes that each routing controller is required to store, network bandwidth and computer resources (e.g., computer memory and processing power) may be optimized. Other technical advantages will be readily apparent to one skilled in the art from the following figures, descriptions, and claims. Moreover, while specific advantages have been enumerated above, various embodiments may include all, some, or none of the enumerated advantages.

Example Embodiments

The present disclosure relates generally to multi-region SD-WANs that have distributed routing controllers as opposed to a typical SD-WAN that has centralized routing controllers. Large enterprises and organization that have footprints that span multiple regions (e.g., multiple cities, states, or counters) may deploy a SD-WAN to support various technological requirements. Such deployments typically have high scale requirements. For example, an organization's SD-WAN may need the ability to scale up to tens of thousands of routers. However, due to a typical SD-WAN having a centralized routing controller cluster (e.g., a centralized cluster of Cisco vSmart Controllers), typical SD-WAN deployments may have limitations in their ability to scale up to the required number of routers.

To address these and other problems with typical SD-WANs that have centralized routing controllers, the enclosed embodiments provide an architecture for a distributed, per-region routing controller architecture that allows a multi-region SD-WAN to scale horizontally to a greater degree than existing SD-WANs with centralized routing controllers. The distributed routing controller architecture of the disclosed embodiments addresses scaling limitations of existing SD-WANs with centralized routing controllers by providing an architecture where the routing controllers (i.e., vSmart controllers) are assigned to a particular region and can have different states than the routing controllers in a different region. This allows overall greater route scaling in the full SD-WAN since each routing controller does not store the routes for the entire SD-WAN but rather only the routes for its region. To accomplish this architecture, the disclosed embodiments provide fully automated dynamic peering logic for edge/border routers that utilizes region specific identifiers to program edge/border routers to peer only with routing controllers assigned to the same region of the edge/border routers. For example, all border routers of a particular SD-WAN region are programmed to only peer with routing controllers having the same region identifier as the border routers (i.e., the border routers will not peer with the routing controllers assigned to a different SD-WAN region). As a result, a SD-WAN according to the disclose embodiments is able to scale horizontally greater than existing SD-WANs with centralized routing controllers.

FIG. 1 illustrates a network diagram illustrating a multi-region SD-WAN environment 100 with distributed routing controllers 120. Multi-region SD-WAN environment 100 includes multiple SD-WAN regions 110. For example, multi-region SD-WAN environment 100 may include a first SD-WAN region 110A, a second SD-WAN region 110B, a third SD-WAN region 110C, and a core/middle mile SD-WAN region 110D. Each SD-WAN region 110 includes multiple routing controllers 120. For example, first SD-WAN region 110A includes routing controllers 120A-1 and 120A-2, second SD-WAN region 110B includes routing controllers 120B-1 and 120B-2, third SD-WAN region 110C includes routing controllers 120C-1 and 120C-2, and core/middle mile SD-WAN region 110D includes routing controllers 120D-1 and 120D-2. Each routing controller 120 peers (e.g., by forming OMP peering/control connection 150 across a network such as the Internet) only with other routing controllers 120 in the same SD-WAN region 110. For example, routing controllers 120A-1 and 120A-2 peer with each other but not with any of the remaining routing controllers 120 of multi-region SD-WAN environment 100. Likewise, each routing controller 120 peers (e.g., by forming OMP peering/control connection 150 across a network such as the Internet) only with edge routers 130 and border routers 140 that are in the same SD-WAN region 110. For example, routing controllers 120A-1 and 120A-2 peer with edge routers 130A-1, 130A-2, and 130A-3 and border routers 140A and 140B but not with any of the remaining edge routers 130 and border routers 140 of multi-region SD-WAN environment 100. Because multi-region SD-WAN environment 100 includes SD-WAN regions 110 that each have dedicated routing controllers 120 that peer only with their respective SD-WAN region 110 (i.e., instead of a typical SD-WAN where a centralized pool of routing controllers peers with the entire SD-WAN), multi-region SD-WAN environment 100 may be able to provide relatively limitless horizontal scaling of routing controller clusters and their associated paths/routes.

Routing controllers 120 analyze and manage the control plane of multi-region SD-WAN environment 100. Unlike edge routers 130 or border routers 140, routing controllers 120 do not handle the transmission of data traffic. Instead, routing controllers 120 provide route information to edge routers 130 and border routers 140. In some embodiments, each routing controller 120 is a Cisco vSmart Controller that is software that runs as a virtual machine on a server. Each routing controller 120 forms an OMP peering/control connection 150 across a network such as the Internet with the edge routers 130, border routers 140, and other routing controllers 120 in the same region 110. Each OMP peering/control connection 150 (e.g., 150A-F) is a communication channel in which a control protocol (i.e., OMP) is used to exchange routing, policy, and management information between network devices. In general, routing controllers 120 establish connections, adjust connections, and maintain the connections that form the SD-WAN fabric. Routing controllers 120 establish and maintain a control plane connection (i.e., an OMP peering/control connection 150) with each edge router 130. Each OMP peering/control connection 150, which runs as a Datagram Transport Layer Security (DTLS) tunnel, is established after device authentication succeeds. In some embodiments, OMP peering/control connection 150 carries an encrypted payload between routing controllers 120 and edge routers 130. This payload may include route information necessary for the routing controller 120 to determine the network topology and to calculate the best routes to network destinations and distribute this route information to edge routers 130. In some embodiments, routing controllers 120 have no direct peering relationships with any devices that an edge router 130 is connected to on the service side of SD-WAN.

Each routing controller 120 stores and maintains a route table that stores the route information (i.e., OMP routes) for its associated region 110 that it learns from edge routers 130 and from any other routing controllers 120 (i.e., via OMP peering/control connection 150) within its region 110. Because multi-region SD-WAN environment 100 provides a distributed per-region architecture for routing controllers 120, each routing controller 120 only stores route information in its route table for the region in which routing controller 120 is operating. For example, routing controllers 120A-1 and 120A-2 only store route information for SD-WAN region 110A that they learn from each other and from edge routers 130A-1, 130A-2, and 130A-3 in SD-WAN region 110A. Likewise, routing controllers 120B-1 and 120B-2 only store route information for SD-WAN region 110B that they learn from each other and from edge routers 130B-1, 130B-2, and 130B-3 in SD-WAN region 110B, and routing controllers 120C-1 and 120C-2 only store route information for SD-WAN region 110C that they learn from each other and from edge routers 130C-1, 130C-2, and 130C-3 in SD-WAN region 110C. Routing controllers 120A-1 and 120A-2 do not store route information for regions 110B or 110C, routing controllers 120B-1 and 120B-2 do not store route information for regions 110A or 110C, and routing controllers 120C-1 and 120C-2 do not store route information for regions 110A or 110B. By having distributed routing controllers 120 that are prevented from storing route information for all regions 110 in the SD-WAN, multi-region SD-WAN environment 100 is able to horizontally scale to a much greater degree than a typical SD-WAN with centralized routing controllers 120 that store route information for all regions 110.

Each SD-WAN region 110 also includes multiple edge routers 130. For example, first SD-WAN region 110A includes edge routers 130A-1, 130A-2, and 130A-3, second SD-WAN region 110B includes edge routers 130B-1, 130B-2, and 130B-3, and third SD-WAN region 110C includes edge routers 130C-1, 130C-2, and 130C-3. Edge routers 140 sit at the perimeter of a site (such as remote offices, branches, campuses, data centers) and provide connectivity among the sites. Edge routers 130 may be either hardware devices or software (e.g., a cloud-based router) that runs as a virtual machine. Edge routers 130 handle the transmission of data traffic. Like routing controllers 120, each edge router 130 peers (e.g., by forming OMP peering/control connection 150) only with the routing controllers 120 in the same SD-WAN region 110. For example, edge routers 130A-1, 130A-2, and 130A-3 peer with routing controllers 120A-1 and 120A-2 but avoid peering with any of the remaining routing controllers 120 of multi-region SD-WAN environment 100.

Each SD-WAN region 110 also includes multiple border routers 140. For example, first SD-WAN region 110A includes border routers 140A and 140B, second SD-WAN region 110B includes border routers 140C and 140D, and third SD-WAN region 110C includes border routers 140E and 140F. Each border router 140 is also in core/middle mile SD-WAN region 110D. Border routers 140 may be either hardware devices or software (e.g., a cloud-based router) that runs as a virtual machine. Border routers 140 handle the transmission of data traffic. Each border router 140 edge router 130 peers (e.g., by forming OMP peering/control connection 150) with the routing controllers 120 in the same SD-WAN region 110 and with the routing controllers 120 of core/middle mile SD-WAN region 110D. For example, border routers 140A and 140B peer with routing controllers 120A-1 and 120A-2 of first SD-WAN region 110A in addition to routing controllers 120D-1 and 120D-2 of core/middle mile SD-WAN region 110D.

Network facilitator 160 is a network device that automatically coordinates the initial onboarding of routing controllers 120, edge routers 130, and border routers 140. In general, network facilitator 160 facilities connectivity between routing controllers 120 and edge routers 130. During the onboarding process, network facilitator 160 authenticates and validates the devices wishing to join the overlay network. For example, network facilitator 160 may receive a register request 170 from a particular SD-WAN edge router 130 such as edge router 130A-1. In some embodiments, the register request 170 may include a particular region identifier of the particular SD-WAN edge router (e.g., a region identifier for SD-WAN region 110A). In response to receiving the register request, network facilitator 160 sends a routing controller list 180 to edge router 130A-1. Routing controller list 180 is a list of routing controllers 120 that has been filtered to only include routing controllers 120 that have region identifiers that match the region identifier of edge router 130A-1 (i.e., routing controllers 120A-1 and 120A-2 for this example.) In this way, network facilitator 160 provides the necessary information for edge routers 130A-1 to only peer with the routing controllers 120 of its region 110A (i.e., routing controllers 120A-1 and 120A-2). In some embodiments, network facilitator 160 is a Cisco vBond Orchestrator. Network facilitator 160 may be either a hardware device or software (e.g., a cloud-based router) that runs as a virtual machine.

In operation, multi-region SD-WAN environment 100 provides a distributed, per-region routing controller architecture that prevents a full mesh of peering/control connections between all routing controllers 120 of the SD-WAN. To do so, multi-region SD-WAN environment 100 performs a unique behavior in control connections and OMP route distribution. To start, each routing controller 120, edge router 130, and border router 140 of multi-region SD-WAN environment 100 is configured with a region identifier that is associated with the particular region 110 in which they belong. For example, SD-WAN region 110A may have a region identifier of "region 1," and all devices in SD-WAN region 110A (e.g., routing controllers 120A-1 and 120A-2, edge routers 130A-1, 130A-2, and 130A-3, and border routers 140A and 140B) are configured with the same region identifier of "region 1." Likewise, SD-WAN region 110B may have a region identifier of "region 2," and all devices in SD-WAN region 110B (e.g., routing controllers 120B-1 and 120B-2, edge routers 130B-1, 130B-2, and 130B-3, and border routers 140C and 140D) are configured with the same region identifier of "region 2." When registering with network facilitator 160, each routing controller 120 presents its region identifier to network facilitator 160. Network facilitator 160 maintains a routing controller list 180 that lists all routing controllers 120 of multi-region SD-WAN environment 100 and the region identifier of each routing controller 120. In this way, network facilitator 160 is aware of which routing controllers 120 are responsible for a given region 110.

Next, when edge routers 130 and border routers 140 register with network facilitator 160, each device sends its assigned region identifier to network facilitator 160 in a register request 170. Network facilitator 160 responds to register request 170 by sending routing controller list 180 back to the requesting device. However, instead of sending routing controller list 180 that lists all routing controllers 120 of multi-region SD-WAN environment 100, network facilitator 160 filters routing controller list 180 to include only the routing controllers 120 that have matching region identifiers to the requesting device. For example, in response to receiving a register request 170 from edge router 130A-1 that includes a region identifier of "region 1," network facilitator 160 responds by sending a routing controller list 180 that is filtered to only include those routing controllers 120 that also have a region identifier of "region 1" (i.e., routing controllers 120A-1 and 120A-2). The receiving device (i.e., edge router 130A-1 in this example) then proceeds to establish control connections and OMP peering (i.e., OMP peering/control connection 150A) only with the routing controllers 120 listed in routing controller list 180 (i.e., routing controllers 120A-1 and 120A-2). In this way, multi-region SD-WAN environment 100 prevents a full mesh of peering/control connection between all the routing controllers 120 in the network across regions 110.

Figure 2:
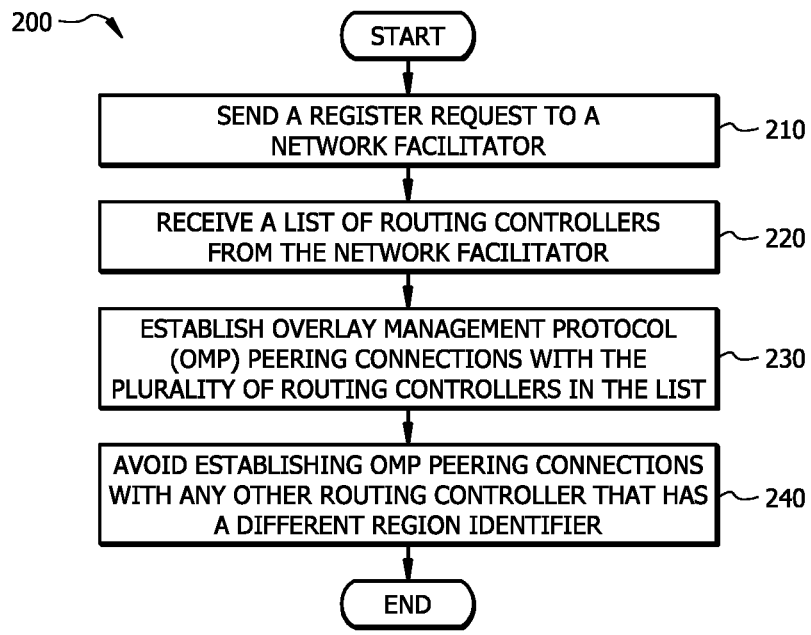
FIG. 2 is a flow diagram illustrating an example method by an edge router in a SD-WAN, according to some embodiments.

FIG. 2 is a flow diagram illustrating an example method 200 by an edge router in a SD-WAN. For example, method 200 may be performed by edge routers 130 of multi-region SD-WAN environment 100. Method 200 may begin in step 210 where a register request is sent to a network facilitator of the SD-WAN. The register request includes a particular region identifier of the SD-WAN edge router. In some embodiments, the register request is register request 170 and the network facilitator is network facilitator 160. In some embodiments, the register request is a request to form a DTLS tunnel.

In step 220, method 200 receives a list of routing controllers from the network facilitator of the SD-WAN. The list of routing controllers identifies one or more routing controllers of the SD-WAN. Each routing controller in the list of routing controllers received from the network facilitator has a region identifier that matches the particular region identifier of the SD-WAN edge router received in step 210. In some embodiments, the list of routing controllers is routing controller list 180. In some embodiments, the plurality of routing controllers are routing controllers 120. In some embodiments, each routing controller is a vSmart Controller.

In step 230, method 200 establishes OMP peering connections with the plurality of routing controllers in the list of routing controllers from the network facilitator received in step 220. In some embodiments, the OMP peering connections are OMP peering/control connections 150.

In step 240, method 200 avoids establishing OMP peering connections with any other routing controller that has a different region identifier from the particular region identifier of the SD-WAN edge router. For example, if the particular region identifier of the SD-WAN edge router is "region 1," the SD-WAN edge router will avoid establishing OMP peering connections with a routing controller that has a region identifier of "region 2," "region 3," or any other region identifier other than "region 1." After step 240, method 200 may end.

Figure 3:
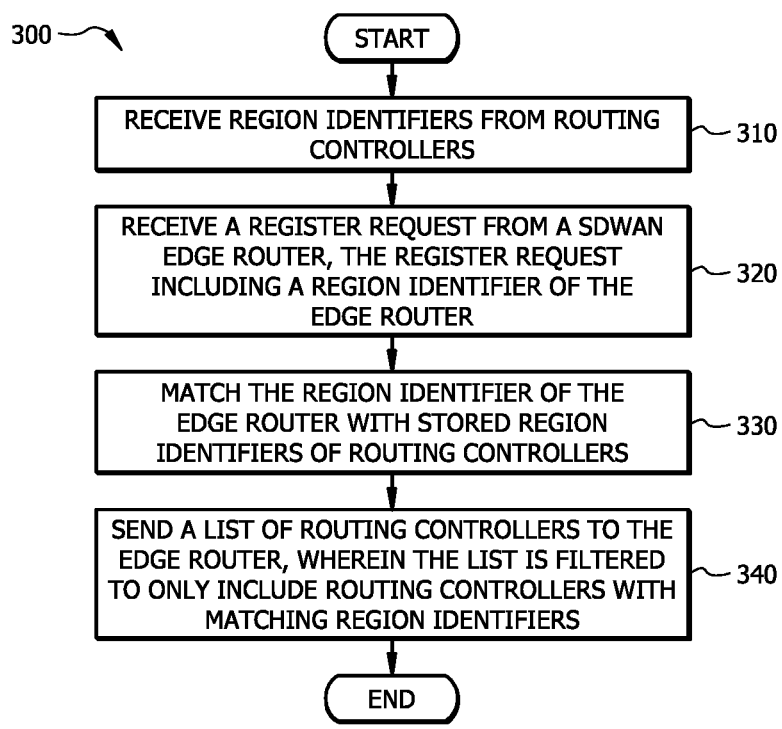
FIG. 3 is a flow diagram illustrating an example method by a route controller in a SD-WAN, according to some embodiments.

FIG. 3 is a flow diagram illustrating an example method 300 by a route controller in a SD-WAN. For example, method 300 may be performed by network facilitator 160 of multi-region SD-WAN environment 100. Method 300 may begin in step 310 where method 300 receives region identifiers from routing controllers of the SD-WAN. For example, each routing controller may send its associated region identifier in a request to register with the SD-WAN. In some embodiments, the request to register is register request 170. In some embodiments, method 300 may form and maintain a list of routing controller and their associated region identifiers. For example, method 300 may form and maintain routing controller list 180.

In step 320, method 300 receives a register request from a SD-WAN edge router. The register request includes a region identifier of the edge router. In some embodiments, the register request is register request 170. In some embodiments, the SD-WAN edge router is edge router 130.

In step 330, method 300 matches the region identifier of the edge router received in step 320 with stored region identifiers of routing controllers. For example, method 300 may analyze a full list of routing controllers of the SD-WAN in order to identify those routing controllers that have an identical region identifier to the region identifier of the edge router received in step 320.

In step 340, method 300 sends a list of routing controllers to the edge router. In some embodiments, the list of routing controllers is the filtered list of routing controllers that is filtered to only include routing controllers with matching region identifiers identified in step 330. In some embodiments, the list of routing controller is routing controller list 180. After step 340, method 300 may end.

Figure 4:
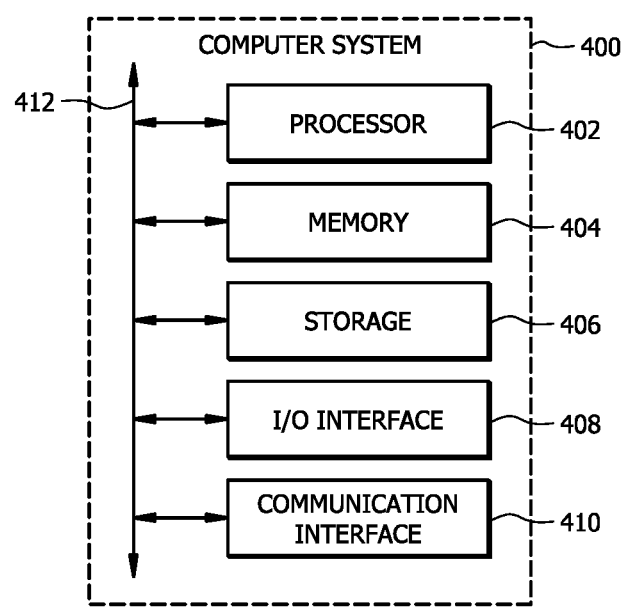
FIG. 4 is a diagram showing an example computer architecture for a device capable of executing program components that can be utilized to implement aspects of the various technologies presented herein, according to some embodiments.

FIG. 4 shows an example computer architecture for a device capable of executing program components for implementing the functionality described above. The computer architecture shown in FIG. 4 illustrates any type of computer 400, such as a conventional server computer, workstation, desktop computer, laptop, tablet, network appliance, e-reader, smartphone, or other computing device, and can be utilized to execute any of the software components presented herein. The computer 400 may, in some examples, correspond to a one or more devices described herein such as routing controllers 120, edge routers 130, border routers 140, network facilitator 160, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology. Computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the Internet. The chipset 406 can include functionality for providing network connectivity through a NIC 412, such as a gigabit Ethernet adapter. The NIC 412 is capable of connecting the computer 400 to other computing devices over the network 424. It should be appreciated that multiple NICs 412 can be present in the computer 400, connecting the computer to other types of networks and remote computer systems.

The computer 400 can be connected to a storage device 418 that provides nonvolatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by routing controllers 120, edge routers 130, border routers 140, network facilitator 160, and/or any other device described herein, may be supported by one or more devices similar to computer 400. Stated otherwise, some or all of the operations performed by the routing controllers 120, edge routers 130, border routers 140, network facilitator 160, and/or any other device described herein, may be performed by one or more computer devices 400.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 2 and 3. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device.

As described herein, the computer 400 may comprise one or more of a routing controller 120, edge router 130, border router 140, network facilitator 160, and/or any other device described herein. The computer 400 may include one or more hardware processors 404 (processors) configured to execute one or more stored instructions. The processor(s) 404 may comprise one or more cores. Further, the computer 400 may include one or more network interfaces configured to provide communications between the computer 400 and other devices, such as the communications described herein as being performed by the routing controllers 120, edge routers 130, border routers 140, network facilitator 160, and/or any other device described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 422 may comprise any type of programs or processes to perform the techniques described in this disclosure.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A software defined wide area network (SD-WAN) comprising:
    a first region comprising:
        a plurality of first routing controllers, each first routing controller stores a plurality of first routes for the first region; and
        a plurality of first SD-WAN edge routers; and
    a second region comprising:
        a plurality of second routing controllers, each second routing controller stores a plurality of second routes for the second region;
    wherein each first routing controller of the first region is prevented from storing the plurality of second routes for the second region; and
    each second routing controller of the second region is prevented from storing the plurality of first routes for the first region; and
        a plurality of second SD-WAN edge routers;
    wherein each first SD-WAN edge router of the first region is configured to:
        establish Overlay Management Protocol (OMP) peering connections with the plurality of first routing controllers of the first region; and
        avoid establishing OMP peering connections with the plurality of second routing controllers of the second region; and
    wherein each second SD-WAN edge router of the second region is configured to:
        establish OMP peering connections with the plurality of second routing controllers of the second region; and
        avoid establishing OMP peering connections with the plurality of first routing controllers of the first region.

2. The SD-WAN of claim 1, wherein:
    each first routing controller of the plurality of first routing controllers is configured to establish OMP peering connections with other first routing controllers of the first region;
    each first routing controller of the plurality of first routing controllers is prevented from establishing OMP peering connections with any routing controllers outside of the first region;
    each second routing controller of the plurality of second routing controllers is configured to establish OMP peering connections with other second routing controllers of the second region; and
    each second routing controller of the plurality of second routing controllers is prevented from establishing OMP peering connections with any routing controllers outside of the second region.

3. The SD-WAN of claim 1, further comprising:
    a network facilitator configured to:
        receive a register request from a particular SD-WAN edge router of the pluralities of first and second SD-WAN edge routers, the register request comprising a particular region identifier of the particular SD-WAN edge router; and
        in response to receiving the register request, send a list of routing controllers to the particular SD-WAN edge router, wherein each routing controller in the list of routing controllers has a region identifier that matches the particular region identifier of the particular SD-WAN edge router.

4. The SD-WAN of claim 1, further comprising:
a plurality of first border routers of the first region, wherein each first border router is configured to:
  establish OMP peering connections with the plurality of first routing controllers of the first region;
  establish OMP peering connections with a plurality of core routing controllers of a core region; and
  avoid establishing OMP peering connections with the plurality of second routing controllers of the second region; and
a plurality of second border routers of the second region, wherein each second border router is configured to:
  establish OMP peering connections with the plurality of second routing controllers of the second region;
  establish OMP peering connections with the plurality of core routing controllers of the core region; and
  avoid establishing OMP peering connections with the plurality of first routing controllers of the first region.

5. The SD-WAN of claim 1, further comprising:
a core region comprising:
  a plurality of core routing controllers; and
  a plurality of SD-WAN border routers.

6. The SD-WAN of claim 5, wherein each SD-WAN border router is configured to:
  establish OMP peering connections with the plurality of core routing controllers of the core region; and
  establish OMP peering connections with routing controllers of only one other region of the first or second regions.

7. A method performed by a software defined wide area network (SD-WAN) edge router in a SD-WAN, the method comprising:
  sending a register request to a network facilitator of the SD-WAN, the register request comprising a particular region identifier of the SD-WAN edge router;
  receiving a list of routing controllers from the network facilitator of the SD-WAN, wherein:
    the list of routing controllers identifies a plurality of routing controllers of the SD-WAN; and
    each routing controller in the list of routing controllers received from the network facilitator has a region identifier that matches the particular region identifier of the SD-WAN edge router, and each routing controller stores the plurality of routes for the region that matches the particular region identifier of the SD-WAN edge router and is prevented from storing the plurality of routes for any region that does not match the particular region identifier of the SD-WAN edge router; and
  establishing Overlay Management Protocol (OMP) peering connections with the plurality of routing controllers in the list of routing controllers from the network facilitator; and
  avoiding establishing OMP peering connections with any other routing controller that has a different region identifier from the particular region identifier of the SD-WAN edge router.

8. A method performed by a software defined wide area network (SD-WAN) network facilitator in a SD-WAN, the method comprising:
  receiving a first region identifier from a plurality of first routing controllers of a first region, each first routing controller stores a plurality of first routes for the first region;
  receiving a second region identifier from a plurality of second routing controllers of a second region, each second routing controller stores a plurality of second routes for the second region;
  receiving a register request from a SD-WAN edge router, the register request comprising a particular region identifier of the SD-WAN edge router;
  determining that the particular region identifier of the SD-WAN edge router matches the first region identifier of the plurality of first routing controllers of the first region; and
  determining that the plurality of first routing controllers of the first region store the plurality of routes for the first region and do not store the plurality of routes for the second region; and
  sending a list of routing controllers to the SD-WAN edge router, wherein the list of routing controllers includes the plurality of first routing controllers and excludes the plurality of second routing controllers.

9. The method of claim 8, further comprising:
  receiving a second register request from a SD-WAN border router, the second register request comprising a particular region identifier of the SD-WAN border router;
  determining that the particular region identifier of the SD-WAN border router matches the second region identifier of the plurality of second routing controllers of the second region; and
  sending a second list of routing controllers the SD-WAN border router, wherein the second list of routing controllers includes the plurality of second routing controllers and excludes the plurality of first routing controllers.

* * * * *